(12) United States Patent
Segeren et al.

(10) Patent No.: US 8,070,028 B2
(45) Date of Patent: Dec. 6, 2011

(54) FOLDABLE TRUCK BED EXTENDER

(75) Inventors: Michael Segeren, Charing Cross (CA);
Donald Segeren, Charing Cross (CA);
Jason Hawkins, London (CA)

(73) Assignee: Seg-Ins Inc., Charing Cross, Ontario (CA)

(*) Notice: Subject to any disclaimer, the term of this patent is extended or adjusted under 35 U.S.C. 154(b) by 427 days.

(21) Appl. No.: 12/474,447

(22) Filed: May 29, 2009

(65) Prior Publication Data

US 2009/0295182 A1   Dec. 3, 2009

Related U.S. Application Data

(60) Provisional application No. 61/071,975, filed on May 29, 2008.

(51) Int. Cl.
*B60R 9/06* (2006.01)

(52) U.S. Cl. ........ 224/402; 224/405; 224/497; 224/506; 224/519; 224/532; 296/26.08; 296/26.11

(58) Field of Classification Search ............ 224/402, 224/405, 502, 503, 504, 505, 506, 507, 519, 224/521, 531, 532, 497, 548, 549, 520; 296/26.08, 296/26.11; 211/196, 205
See application file for complete search history.

(56) References Cited

U.S. PATENT DOCUMENTS

| | | | |
|---|---|---|---|
| 2,635,891 A * | 4/1953 | Cook | 280/495 |
| 5,451,088 A * | 9/1995 | Broad | 296/26.08 |
| 5,458,389 A | 10/1995 | Young | |
| 5,649,656 A * | 7/1997 | Davy | 224/405 |
| 5,678,743 A * | 10/1997 | Johnson et al. | 224/485 |
| 5,752,636 A | 5/1998 | Manley | |
| 5,938,092 A * | 8/1999 | Johnson | 224/521 |
| 5,950,890 A * | 9/1999 | Darby | 224/402 |
| 6,050,627 A * | 4/2000 | Lee | 296/26.09 |
| 6,070,926 A * | 6/2000 | Hardin | 296/26.08 |
| 6,533,337 B1 * | 3/2003 | Harshman et al. | 296/26.08 |
| 6,648,391 B1 * | 11/2003 | Whiteford et al. | 296/26.08 |
| 6,678,743 B1 | 1/2004 | Glass et al. | |
| 7,243,966 B1 * | 7/2007 | Sheldon | 296/26.08 |
| 7,861,903 B2 * | 1/2011 | Plaschka | 224/402 |
| 7,914,060 B2 * | 3/2011 | Scribner et al. | 296/26.08 |
| 2004/0134870 A1 * | 7/2004 | Daubach et al. | 211/196 |
| 2004/0232185 A1 * | 11/2004 | Darby | 224/521 |
| 2004/0245795 A1 * | 12/2004 | Hansen | 296/26.08 |
| 2009/0140538 A1 * | 6/2009 | Larson | 296/26.08 |
| 2011/0024473 A1 * | 2/2011 | Weiss | 224/500 |

FOREIGN PATENT DOCUMENTS

CA    2153029    1/1996

* cited by examiner

*Primary Examiner* — Justin Larson

(57) ABSTRACT

A truck bed extender including an elongated support adapted for securement in a trailer hitch mounted on a truck, and a shorter upright support pivotally mounted at the opposite end of the elongated support, for pivotal rotation from a collapsed position generally alongside said elongated support, to an upright position extending upwardly away from said elongated support. A pair of arms are pivotally mounted to said upright support, generally at the top thereof, for rotation from a collapsed position, in which the arms extend generally side by side upwardly from and generally in alignment with said upright support, outwardly to an operating position in which they extend outwardly in opposite lateral directions away from one another. The truck bed extender can readily be installed into a trailer hitch and erected to provide extended support for items placed in a truck bed, and can be readily collapsed into a generally elongated condition with said upright support and said arms extending generally alongside said elongated support.

20 Claims, 5 Drawing Sheets

FOLDABLE TRUCK BED EXTENDER

CROSS REFERENCE TO RELATED APPLICATION

Applicant claims priority to U.S. provisional application Ser. No. 61/071,975, filed May 29, 2008.

FIELD OF THE INVENTION

This invention relates to devices for effectively extending the bed length of a truck. These devices are removably mounted to the vehicle using a standard hitch on the vehicle.

BACKGROUND OF THE INVENTION

It is often necessary to transport a load having a length that is greater than the bed length of the truck. When transported the load will extend beyond the body of the vehicle and may fall out or become damaged during transport because of a lack of horizontal or lateral support. Truck bed extenders can be mounted on the back of the truck, to provide support for such items.

SUMMARY OF THE INVENTION

The present invention is a truck bed extender which is foldable and collapsible for ease of storage when not in use. Preferably the device can be quickly and easily attached and removed from the vehicle. The device can also preferably be installed, removed, collapsed, folded and stored by one person of average size and strength.

DETAILED DESCRIPTION OF THE PREFERRED EMBODIMENT

Figure 1:
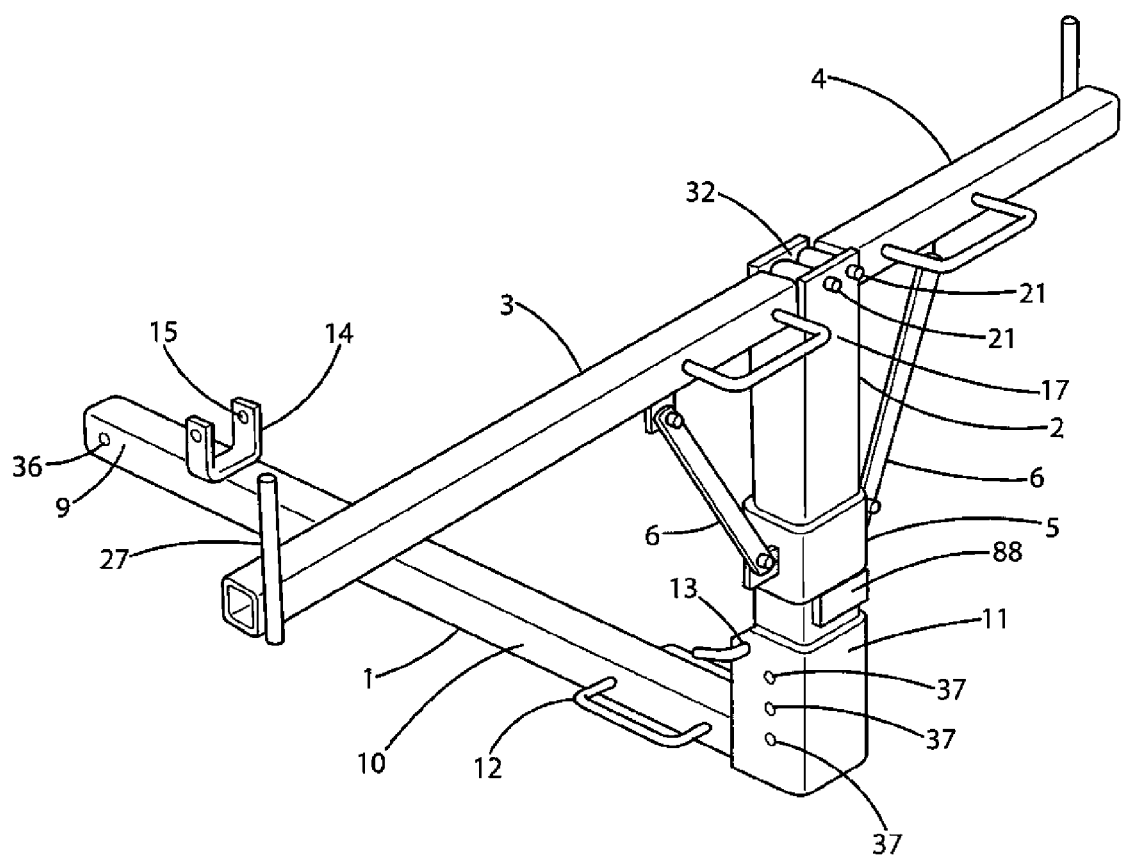
FIG. 1 is an assembly view of the truck bed extender.

For purposes of brevity the foldable truck bed extender according to the preferred embodiment shall hereinafter be referred to as an extender. A preferred embodiment of the present invention is shown in FIG. 1 for mounting on a standard trailer hitch attached to vehicle having a bed for transporting items. The extender is comprised of a main body 1, an upright support 2, a left hand horizontal support 3, a right hand horizontal support 4, a sliding collar 5, and two support linkages (6 and 7) assembled together as shown.

Figure 2:
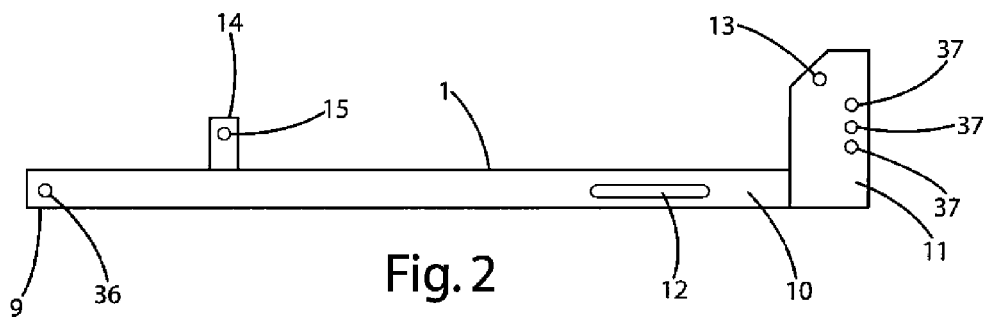
FIG. 2 is a side view of main body 1.
Figure 8:
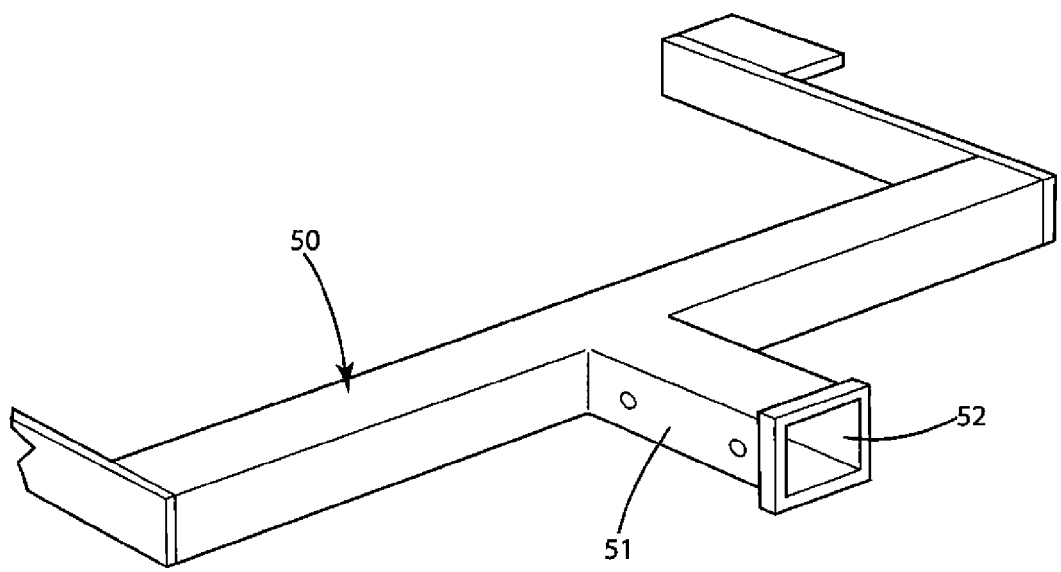
FIG. 8 is an assembly view of a standard hitch assembly 50.

The main body 1, fabricated of square metal tubing, has a first end 9 and a second end 10 (FIGS. 1 and 2). The first end 9 is inserted into the receiver tube 51 of a standard hitch assembly 50 (FIG. 8) and is retained therein by means of a hitch pin or other conventional retainer. The main body is cantilevered from hitch assembly 50 in a horizontal plane. A through hole 36 is provided in the first end 9 to slidably receive a hitch pin to thus secure the main body 1 within the standard hitch assembly in the usual fashion.

The second end 10, of the main body 1, has a U-shaped channel 11 that is fixedly attached by welding or the like to provide a vertical sleeve suitable for receiving upright post 2. Through hole 13 is provided near the upper left hand corner of formed channel 11 for receiving a hitch pin 13a to vertically secure the upright post 2 therein. The U-shaped channel 11 is provided with three vertically spaced apart through holes 37 to allow for height adjustment of the extender by means of vertical movement of the upright post 2 within the channel.

Two U-shaped handles 12 are fixedly attached on opposing sides of the main body 1 proximate to the second end 10 and are used to manipulate or store the extender as well as serving as a suitable anchor for attaching tie down ropes securing the load. A saddle fitting 14 is fixedly attached to the top surface of main body 1 proximate to the first end 9 to secure the extender in the folded position with retaining pin 15a passed through holes 15.

Figure 3:
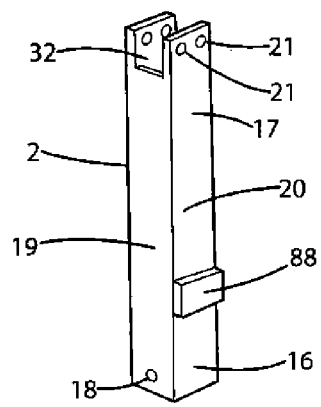
FIG. 3 is a perspective view of upright post 2.
Figure 4:
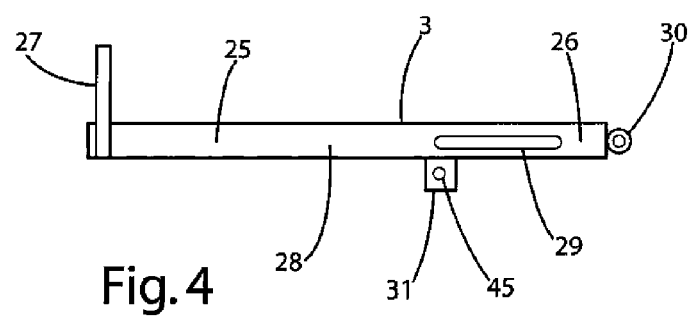
FIG. 4 is a side view of the horizontal support arm 3.

The upright post 2 (FIGS. 1 and 3) of the extender has a bottom end 16 and a top end 17. A through hole 18 is located at the bottom end 16 in an aligned relationship with holes 37 to permit vertical adjustment of the post with reference to the U-shaped channel by means of a bolt 22 passing through one set of holes 37 and holes 18. Once adjusted, the bolt 22 becomes the pivot point for rotating the upright post with reference to the main body. Two through holes 21, suitable for receiving bolts, are located at the top end 17 for pivotal attachment to the ends 30 and 43 of the horizontal arms 3 and 4 (FIG. 4). Open ended cutouts (32 and 33) are provided at the top of upright post 2 to permit the pivotal connection for the load supporting arms 3 and 4.

Each load supporting arms 3 and 4, fabricated from square tubing has a steel retaining pin 27 fixedly attached to one end in order to provide lateral confinement to the load (FIG. 4). While FIG. 4 shows only arm 3, arm 4 is the mirror image of arm 3 and has the same components. The pivot ends 30 of the load supporting arms 3 and 4 are pivotally connected to the upright post by means of pins 21a passing through holes 21. Tabs 31, fixedly attached on the underside of the load supporting arms 3 and 4, are provided with holes 45 for pivotal connection to one end 48 of linkage bar 6. A U-shaped handle 29 is fixedly attached each load supporting arm to assist in carrying the extender in the folded position and to provide an anchor location for tie downs.

Figure 5:
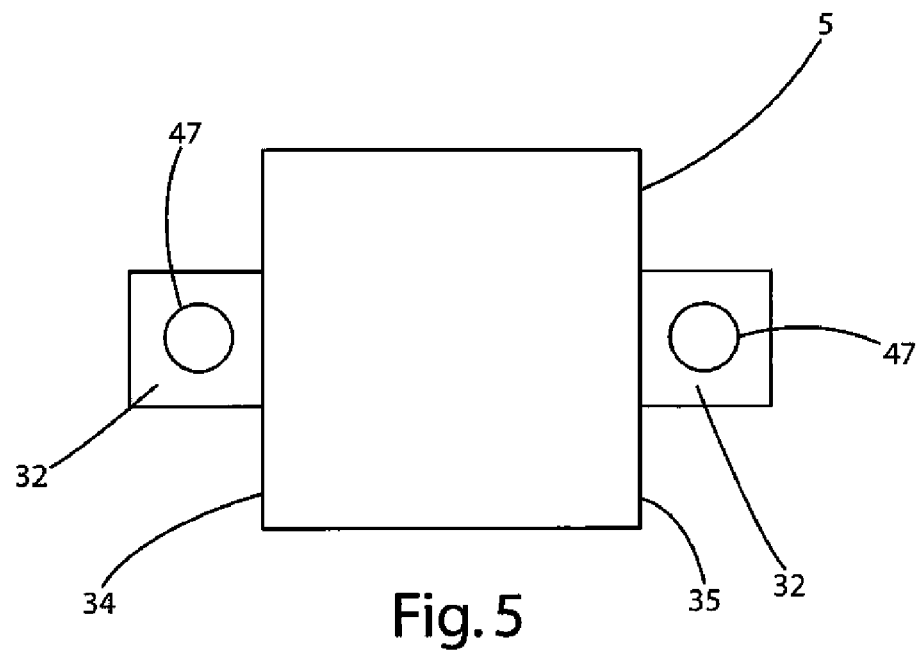
FIG. 5 is a side view of sliding collar 5.

Sliding collar 5 (FIG. 5) is fabricated as a square tube such that its internal dimensions are sufficient to provide a sliding fit when placed over upright post 2. On each opposing sides 34 and 35 of the collar 5 are tabs 32 each having a hole 47 for pivotal connection to the other end of a linkage bar 6.

Figure 6:
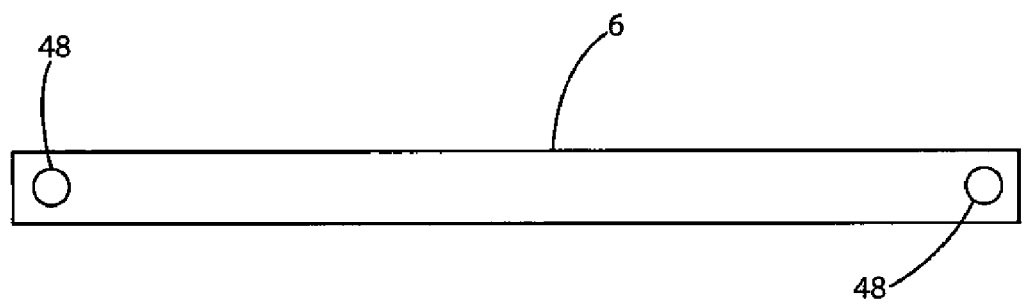
FIG. 6 is a side view of support links 6.

Linkage bar 6 (FIG. 6) is suitably dimensioned to allow for horizontal orientation of the load supporting arms when the sliding collar abuts against stop 88 on post 2.

Figure 7:
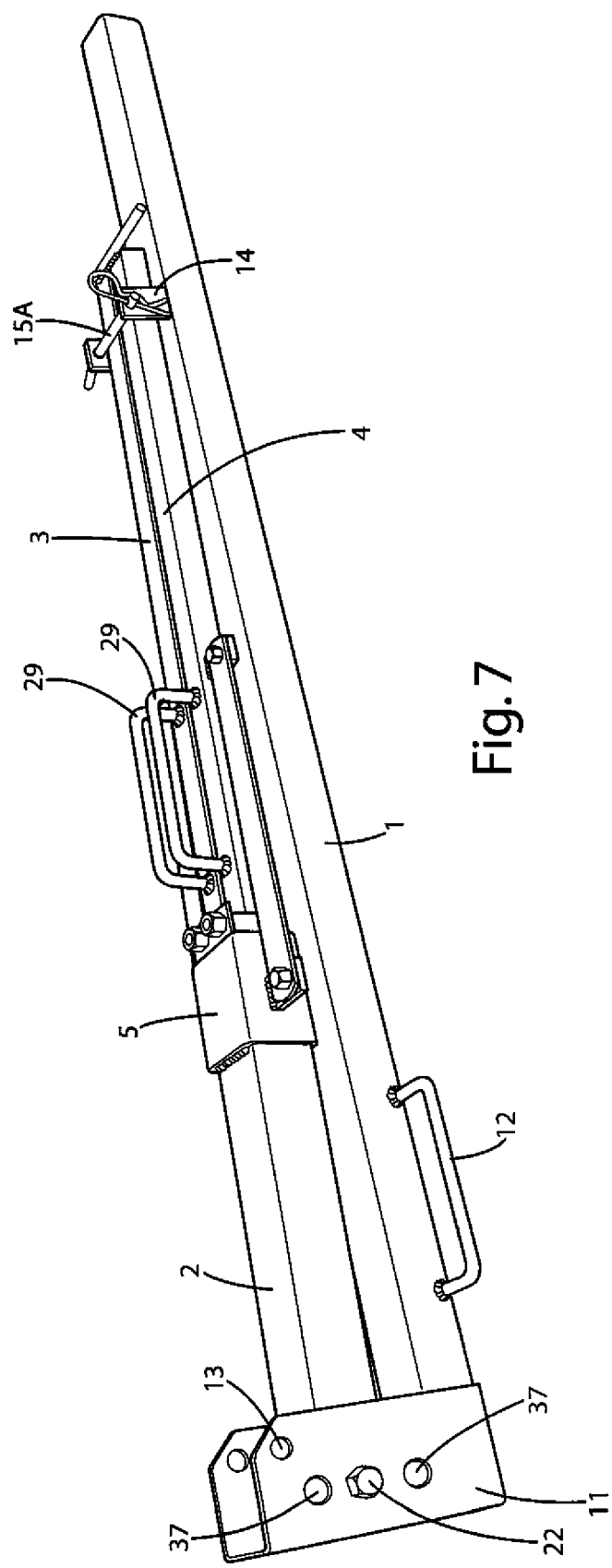
FIG. 7 is a view of the foldable truck bed extender in the collapsed and folded position.

The truck bed extender is collapsed from its operating position as shown in FIG. 1 to its collapsed position as shown in FIG. 7 by removing pin 13a from sleeve 11, and folding upright post 2 at least partially downwardly toward main body tube 1. Support arms 3 and 4 are then pivoted upwardly (as viewed in FIG. 1), causing collar 5 to slide upwardly on post 2. The retaining pins 27 on arms 3 and 4 are located on opposite sides of their respective arms, such that they do not interfere as support arms 3 and 4 are brought upwardly into abutment with one another. The upright 2 and arms 3 and 4 are then generally in alignment, and are lowered the rest of the way such that arms 3 and 4 are positioned in saddle 14. A pin is inserted through holes 15 of saddle 14, to secure the truck bed extender in its collapsed condition as shown in FIG. 7, with upright 2 and arms 3 and 4 extending generally alongside elongated support 7. Handles 29 on arms 3 and 4 provide a convenient handle for carrying the collapsed truck bed extender.

For installation of the extender, the first end 9 of the main body 1 is inserted into the hitch opening 52 of receiver tube 51 such that through holes align and is secured therein by means of the hitch pin. The retaining pin 15a in the saddle fitting is then removed and the load supporting arms and the upright post 2 assembly are pivoted upwardly about the bolt location 22 into a vertical position. A hitch pin 13a is then inserted through the holes 13 to retain the upright post 2 in its upright position. The load supporting arms 3 and 4 are then pivoted outwardly and downwardly into a horizontal position causing the sliding collar 5 to slide down the upright post 2 and against collar stop 88.

The extender as shown in FIG. 1 is now installed and ready to be used. To uninstall the extender, the above mentioned steps can be performed in reverse order as described above, to return the extender to its folded and collapsed position, as shown in FIG. 7.

The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A truck bed extender comprising: an elongated support adapted at a first end for insertion into and securement in a trailer hitch mounted on a truck, said elongated support extending generally horizontally from such a hitch when so secured; a shorter upright support pivotally mounted on said elongated support generally at the second end thereof, for pivotal rotation from a collapsed position generally alongside said elongated support, to an upright position extending upwardly away from said elongated support; a pair of arms pivotally mounted to said upright support, generally at the top thereof, for rotation from a collapsed position, in which said arms extend generally side by side upwardly from and above and generally in alignment with said upright support, outwardly to an operating position in which they extend outwardly in opposite lateral directions away from one another and away from said top of said upright support; whereby said truck bed extender can readily be installed into a trailer hitch and erected to provide extended support for items placed in a truck bed, and can be readily collapsed into a generally elongated condition with said upright support and said arms extending generally alongside said elongated support.

2. The truck bed extender of claim 1 which includes an upwardly opening saddle on said elongated support near said first end thereof, for receiving said arms when they are pivoted into abutment and said upright is pivoted downwardly such that said upright and said arms extend generally alongside said elongated support.

3. The truck bed extender of claim 1 in which each of said arms includes an upright retainer extending upwardly from each of said arms generally at the outer ends thereof, away from said pivotal mount; said upright retainers being mounted on opposite sides of their respective arms, such that they do not interfere with one another when said arms are rotated into their collapsed, abutting positions.

4. The truck bed extender of claim 1 which includes a collar slidably mounted on said upright; a pair of links, each pivotally mounted to said collar on opposite sides thereof in the plane of said arms when they are opened outwardly away from one another; each of said links extending upwardly to its respective one of said arms, and being pivotally mounted to its respective arm, whereby when said arms are pivoted into abutment in their collapsed condition, said collar slides upwardly on said upright support, and when said arms are pivoted outwardly away from one another, said collar slides downwardly on said upright support and said links extend outwardly from said collar to provide support for said arms in their outwardly extending positions.

5. The truck bed extender of claim 1 in which said pivotal mount of said upright support on said elongated support is provided by a channel-shaped mount secured to and extending upwardly from said second end of said elongated mount support;
    said mount being generally channel-shaped, having opposed side walls joined by a base wall, with its channel opening towards said first end of said elongated support;
    said upright support being pivotally secured to said mount between said opposed sidewalls of said channel, such that said upright support can be pivoted into an upright position in which it abuts the base wall of said channel, or can be pivoted downwardly such that it projects forwardly out of said channel.

6. The truck bed extender of claim 5 which includes a handle mounted on at least one of said arms such that it extends generally rearwardly from said arm when said upright is in its erected position, and upwardly from said arm when said upright is in its collapsed position along side said elongated support, whereby said handle provides a carrying handle with which to carry the collapsed truck bed extender.

7. The truck bed extender of claim 6 which includes an upwardly opening saddle on said elongated support near said first end thereof, for receiving said arms when they are pivoted into abutment and said upright is pivoted downwardly such that said upright and said arms extend generally alongside said elongated support.

8. The truck bed extender of claim 7 which includes a securement for said saddle whereby said arms can be retained in said saddle.

9. The truck bed extender of claim 1 which includes a handle mounted on at least one of said arms such that it extends generally rearwardly from said arm when said upright is in its erected position, and upwardly from said arm when said upright is in its collapsed position along side said elongated support, whereby said handle provides a carrying handle with which to carry the collapsed truck bed extender.

10. The truck bed extender of claim 9 in which there is one handle on each of said arms, said handles being positioned on said arms such that they are adjacent one another when said arms are folded into abutting relationship, and are located generally centrally of said truck bed extender when it is in its fully collapsed position.

11. The truck bed extender of claim 10 in which said pivotal mount of said upright support on said elongated support is provided by a channel-shaped mount secured to and extending upwardly from said second end of said elongated mount support;
    said mount being generally channel-shaped, having opposed side walls joined by a base wall, with its channel opening towards said first end of said elongated support;
    said upright support being pivotally secured to said mount between said opposed sidewalls of said channel, such that said upright support can be pivoted into an upright position in which it abuts the base wall of said channel, or can be pivoted downwardly such that it projects forwardly out of said channel.

12. The truck bed extender of claim 11 in which said upright is adjustably as well as pivotally mounted in said channel-shaped mount, such that the height to which said upright extends upwardly from said elongated support can be adjusted.

13. The truck bed extender of claim 12 which includes an upwardly opening saddle on said elongated support near said first end thereof for receiving said arms when they are pivoted into abutment and said upright is pivoted downwardly such that said upright and said arms extend generally alongside said elongated support.

14. The truck bed extender of claim 13 which includes a securement for said saddle whereby said arms can be retained in said saddle.

15. The truck bed extender of claim 14 in which each of said arms includes an upright retainer extending upwardly from each of said arms generally at the outer ends thereof, away from said pivotal mount.

16. The truck bed extender of claim 15 in which said upright retainers are mounted on opposite sides of their respective arms, such that they do not interfere with one another when said arms are rotated into their collapsed, abutting positions.

17. The truck bed extender of claim 16 which includes a collar slidably mounted on said upright; a pair of links, each pivotally mounted to said collar on opposite sides thereof in the plane of said arms when they are opened outwardly away from one another; each of said links extending upwardly to its respective one of said arms, and being pivotally mounted to its respective arm, whereby when said arms are pivoted into abutment in their collapsed condition, said collar slides upwardly on said upright support, and when said arms are pivoted outwardly away from one another, said collar slides downwardly on said upright support and said links extend outwardly from said collar to provide support for said arms in their outwardly extending positions.

18. The truck bed extender of claim 17 in which a collar stop is positioned on said upright support to limit the downward extent of movement of said collar when said arms are pivoted outwardly into their extended positions.

19. The truck bed extender of claim 18 in which said upright support comprises a generally tubular member having arm receiving notches cut into its opposite sides at the top thereof, said arms extending outwardly through said notches when rotated into their outwardly extending, load supporting position.

20. The truck bed extender of claim 19 in which a handle is mounted on each of the opposed sides of elongated support, near said second end thereof.

\* \* \* \* \*